United States Patent [19]

Palafox

[11] 4,180,796

[45] Dec. 25, 1979

[54] VEHICULAR BURGLAR ALARM SYSTEM

[76] Inventor: Jose L. Palafox, P.O. Box 74, Dunlap, Calif. 93621

[21] Appl. No.: 907,935

[22] Filed: May 22, 1978

[51] Int. Cl.² ........................................... B60R 25/10
[52] U.S. Cl. .............................. 340/64; 307/10 AT; 180/287
[58] Field of Search ........................... 340/53, 63, 64; 307/10 AT; 180/114

[56] References Cited
U.S. PATENT DOCUMENTS

| 2,892,181 | 6/1959 | Benson et al. | 340/64 |
| 2,935,730 | 5/1960 | Procter | 340/64 |
| 3,209,326 | 9/1965 | Heiser | 340/64 |
| 3,657,697 | 4/1972 | Schultz | 340/64 |

Primary Examiner—Alvin H. Waring
Attorney, Agent, or Firm—Daniel Jay Tick

[57] ABSTRACT

A vehicular burglar alarm system has an actuating relay which is energized when an intruder closes the ignition switch after the user has set an alarm switch. When the actuating relay is energized, it energizes a control relay which closes various relay contact switches to sound the horn, energize the headlights, energize the emergency lights and cut off the engine of the vehicle.

2 Claims, 2 Drawing Figures

VEHICULAR BURGLAR ALARM SYSTEM

BACKGROUND OF THE INVENTION

The present invention relates to a vehicular burglar alarm system. More particularly, the invention relates to a vehicular burglar alarm system for an automotive vehicle having an engine, a battery, an ignition circuit including an ignition switch and the battery for operating the engine, a horn circuit including a horn, a horn actuating switch and the battery, a headlight circuit including headlights, a headlight energizing switch and the battery, and an emergency light circuit including emergency lights, an emergency light energizing switch and the battery.

Objects of the invention are to provide a vehicular burglar alarm system of simple structure, which is inexpensive in manufacture, installed with facility and convenience in new and existing automotive vehicles, and functions efficiently, effectively and reliably to call attention to a thief stealing the vehicle by sounding the horns, energizing the headlights and emergency lights, and finally, cutting off the engine within a minute after the thief starts off in the vehicle.

BRIEF DESCRIPTION OF THE DRAWINGS

In order that the invention may be readily carried into effect, it will now be described with reference to the accompanying drawing, wherein.

DETAILED DESCRIPTION OF THE INVENTION

Figure 1:
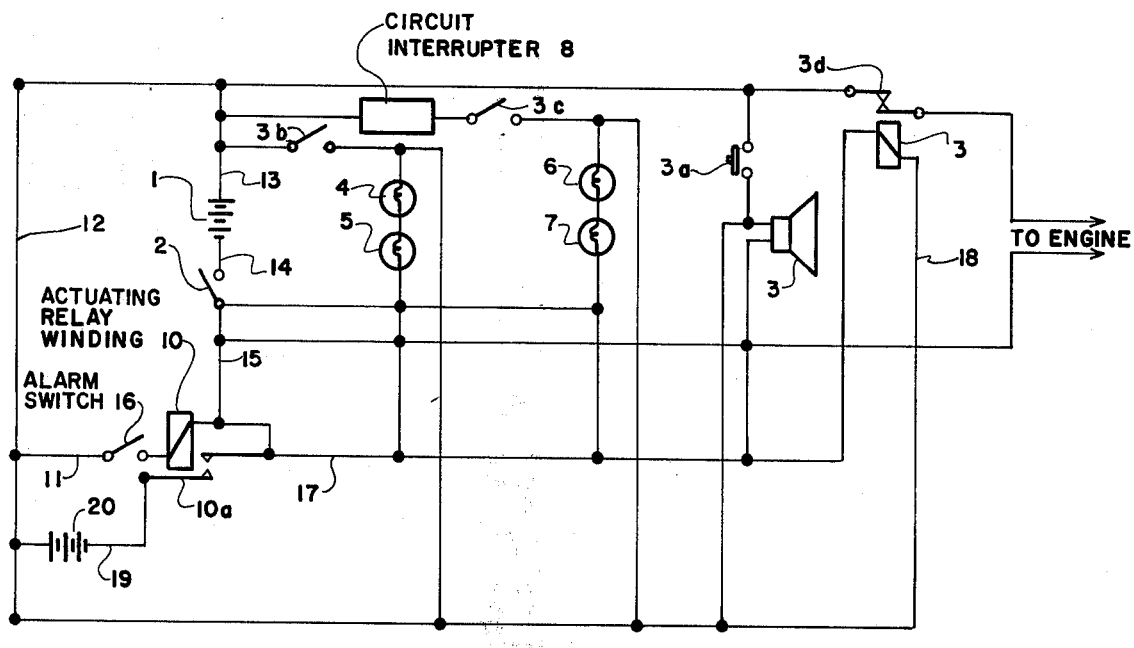
FIG. 1 is a circuit diagram of a first embodiment of the vehicular burglar alarm system of the invention.

The vehicular burglar alarm system of the first embodiment of the invention is for an automotive vehicle having an engine (not shown in the FIGS.), a battery 1 and an ignition circuit including an ignition switch 2 and said battery for operating the engine. The vehicle also has a horn circuit including a horn 3, a horn actuating switch 3a and the battery 1. The vehicle has a headlight circuit including headlights 4 and 5, a headlight energizing switch 3b and the battery 1. The vehicle also has an emergency light circuit including emergency lights 6 and 7, an emergency light energizing switch 3c and the battery 1. The emergency light circuit also includes a circuit interrupter 8.

The vehicular burglar alarm system of the invention comprises an auxiliary ignition circuit switch 3d connected in the ignition circuit. The auxiliary ignition circuit switch 3d is normally closed.

An actuating relay has an actuating relay energizing winding 10 and an actuating relay contact switch 10a controlled in operation by the actuating relay energizing winding. The actuating relay contact switch 10a is normally open.

A first circuit 11, 12, 13, 14, 15 has electrical conductors electrically connecting the battery 1 of the vehicle, the ignition switch 2, the actuating relay energizing winding 10 and an alarm switch 16 in circuit whereby when the ignition switch is closed by a thief after the alarm switch is closed by the owner of the vehicle, the actuating relay energizing winding 10 is energized.

A control relay has a control relay energizing winding 3 and a plurality of control relay contact switches 3a, 3b, 3c and 3d controlled in operation by said control relay energizing winding. The control relay contact switch 3a is the horn actuating switch of the horn circuit of the vehicle. The control relay contact switch 3b is the headlight energizing switch of the headlight circuit of the vehicle. The control relay contact switch 3c is the emergency light energizing switch of the emergency light circuit of the vehicle.

A second circuit 17, 18, 19 has electrical conductors electrically connecting an auxiliary battery 20, the actuating relay contact 10a and the control relay energizing winding 3 in circuit. Thus, when the actuating relay energizing winding 10 is energized, it closes the actuating relay contact switch 10a and energizes the control relay energizing winding 3 via the auxiliary battery 20. The control relay energizing winding 3, when energized, closes the horn actuating switch 3a to sound the horn, closes the headlight energizing switch 3b to energize the headlights, closes the emergency light energizing switch 3c to energize the emergency lights, and opens the auxiliary ignition switch 3d to cut off the engine.

Figure 2:
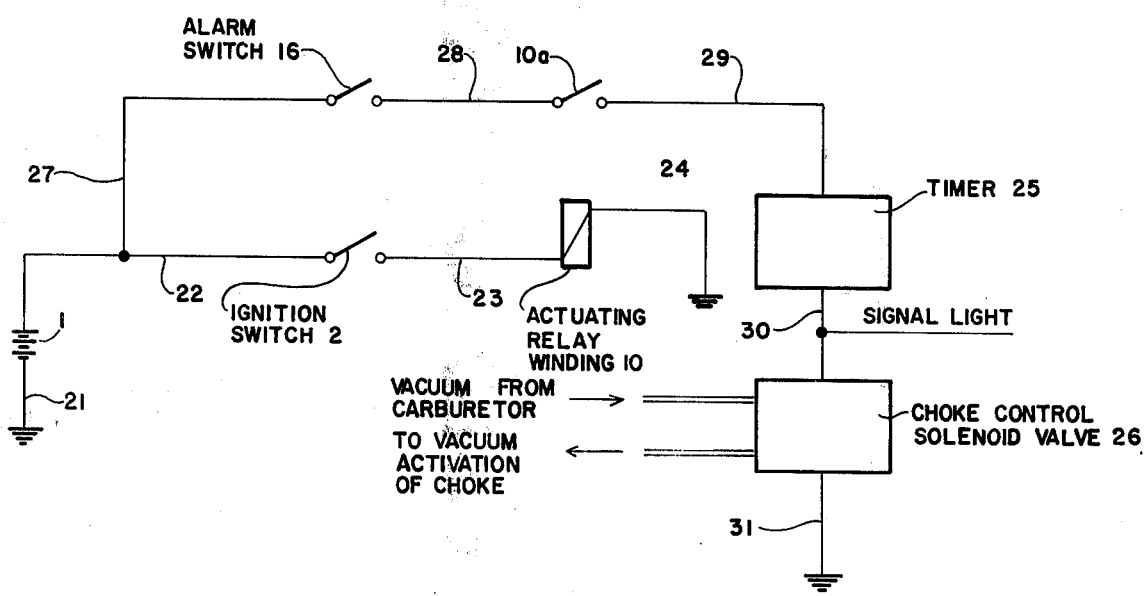
FIG. 2 is a circuit diagram of a second embodiment of the vehicular burglar alarm system of the invention.

In the embodiment of FIG. 2, a first circuit comprises the battery 1 of the vehicle, the ignition switch 2 and the actuating relay winding 10, electrically connected in series circuit arrangement between two points at ground potential via electrical conductors 21, 22, 23, 24. A second circuit comprises the alarm switch 16, the actuating relay contact switch 10a, a timer 25 and a choke control solenoid valve 26, electrically connected in series circuit arrangement between two points at ground potential via electrical conductors 21, 22, 27, 28, 29, 30, 31.

When the owner of the vehicle closes the alarm switch 16 and a thief later closes the ignition switch 2, the actuating relay energizing winding 10 is energized and closes the actuating relay contact switch 10a which is controlled in operation thereby. When the actuating relay contact switch 10a is closed, the circuit 21, 22, 27, 28, 29, 30, 31 is closed, so that the battery 1 energizes the timer 25 and the choke control solenoid valve 26. After a period of time such as, for example, one minute, set by the timer 25, the choke control solenoid valve 26 cuts off the engine of the vehicle by disrupting the operation of the carburetor by drawing the air out and by disrupting the operation of the choke by preventing a flow of fuel to the carburetor.

While the invention has been described by means of a specifci example and in a specific embodiment, I do not wish to be limited thereto, for obvious modifications will occur to those skilled in the art without departing from the spirit and scope of the invention.

I claim:

1. A vehicular burglar alarm system for an automotive vehicle having an engine, a battery, an ignition circuit including an ignition switch and the battery for operating the engine, a horn circuit including a horn, a horn actuating switch and the battery, a headlight circuit including headlights, a headlight energizing switch and the battery, and an emergency light circuit including emergency lights, an emergency light energizing switch and the battery, said vehicular burglar alarm system comprising an auxiliary ignition circuit switch connected in the ignition circuit and being normally closed;

a control relay having a control relay energizing winding and a plurality of control relay contact switches controlled in operation by said control relay energizing winding including the horn actuating switch, the headlight energizing switch, the emergency light energizing switch and the auxiliary ignition circuit switch;

an actuating relay having an actuating relay energizing winding and an actuating relay contact switch controlled in operation by said actuating relay energizing winding;

an alarm switch;

an auxiliary battery;

first circuit means having electrical conductors electrically connecting the battery of the vehicle, the ignition switch, the actuating relay energizing winding and the alarm switch in circuit whereby when the ignition switch is closed by a thief after the alarm switch is closed by the owner of the vehicle the actuating relay energizing winding is energized; and second circuit means having electrical conductors electrically connecting the auxiliary battery, the actuating relay contact switch and the control relay energizing winding in circuit whereby when the actuating relay energizing winding is energized it closes the actuating relay contact switch and energizes the control relay energizing winding, said control relay energizing winding when energized closing the horn actuating switch to sound the horn, closing the headlight energizing switch to energize the headlights, closing the emergency light energizing switch to energize the emergency lights and opening the auxiliary ignition switch to cut off the engine.

2. A vehicular burglar alarm system for an automotive vehicle having an engine, a carburetor, a choke, a battery, an ignition circuit including an ignition switch and the battery for operating the engine, a horn circuit including a horn, a horn actuating switch and the battery, a headlight circuit including headlights, a headlight energizing switch and the battery, and an emergency light circuit including emergency lights, an emergency light energizing switch and the battery, said vehicular burglar alarm system comprising a timer;

a choke control solenoid valve;

an actuating relay having an actuating relay energizing winding and an actuating relay contact switch controlled in operation by said actuating relay energizing winding for controlling the horn actuating switch, the headlight energizing switch and the emergency light energizing switch;

an alarm switch;

first circuit means having electrical conductors electrically connecting the battery of the vehicle, the ignition switch and the actuating relay energizing winding in circuit; and second circuit means having electrical conductors electrically connecting said battery, the alarm switch, the actuating relay contact switch, the timer and the choke control solenoid valve in circuit whereby when the ignition switch is closed by a thief after the alarm switch is closed by the owner of the vehicle the actuating relay energizing winding is energized, and when the actuating relay energizing winding is energized it closes the actuating relay contact switch thereby causing said battery to energize the timer and the choke solenoid valve and closing the horn actuating switch to sound the horn, closing the headlight energizing switch to energize the headlights and closing the emergency light energizing switch to energize the emergency lights, said choke solenoid valve cutting off the engine, after a period of time set by said timer, to disrupt the operation of the carburetor by drawing air out and to disrupt the operation of the choke by preventing a flow of fuel to said carburetor.

* * * * *